3,453,207
METHOD FOR THE REMOVAL OF SOLUBLE PHOSPHATES IN WASTE WATER TREATMENT
John C. Eck, Convent, and William C. Zegel, Mendham, N.J., assignors to Allied Chemical Corporation, New York, N.Y., a corporation of New York
No Drawing. Filed Apr. 28, 1967, Ser. No. 634,443
Int. Cl. C02b 1/20; B01d 21/01
U.S. Cl. 210—49
6 Claims

ABSTRACT OF THE DISCLOSURE

A synergistic combination of alum plus a synthetic cationic organic latex is exceedingly effective at removing dissolved phosphate ion from water by precipitation.

FIELD OF THE INVENTION

This invention relates to a chemical process for removing dissolved phosphate ion from water, especially domestic and industrial waste water. More particularly, this invention relates to the precipitation of dissolved phosphate ion in water by a combination of alum and a cationic organic latex followed by separation of the substantially phosphate free water from the phosphate containing precipitate.

One of the most difficult problems in water pollution control is the growth of algae. Algal blooms now constitute the principal pollution problem in the Potomac River below Washington, in Lake Erie and in countless other water resources.

When these organisms die, they may exert an oxygen demand on the water in excess of its oxygen resources. Algal growths can also cause unpleasant tastes and odors in municipal water supplies. Current waste water treatment procedures remove most domestic wastes except dissolved phosphate. This dissolved phosphate ion provides algae with a necessary nutrient supply. If this phosphate supply could be removed from waste water, the algae would not survive and a major pollution control problem would be solved. Currently known methods for reducing phosphate concentration to an acceptable level are not feasible from an economic standpoint in most instances.

DESCRIPTION OF THE PRIOR ART

Aerobic bacterial action removes part of the dissolved phosphate from waste water by incorporating it into the sludge. Anaerobic bacterial action, however, produces no sludge and will even digest aerobically produced sludge with the release of the phosphate incorporated in such aerobic sludge.

Alum, lime and certain iron salts will precipitate dissolved phosphate from water but impracticably high treating levels are usually required.

SUMMARY OF THE INVENTION

It is a primary object of this invention to provide an economical and effective process for the removal of phosphate ion from water. It is a further object of this invention to provide a process for the removal of phosphate ion from water by the use of a synergistic combination of alum and a synthetic organic cationic latex.

Further objects and advantages will become apparent from the description of the invention which follows in greater detail.

These and other objects are accomplished wherein water containing dissolved phosphate ion is suitably treated in accordance with this invention with a mixture of alum and an organic cationic latex such that the concentration of alum in the water is from 40 p.p.m. to 120 p.p.m. per 100 p.p.m. of dissolved phosphate and the concentration of the organic cationic latex is from 10 p.p.m to 40 p.p.m. per 100 p.p.m. of dissolved phosphate.

When alum alone is used, at least about 200 p.p.m. of alum would be required per 100 p.p.m. of dissolved phosphate for effective removal thereof.

While the primary application of this invention will be in the removal of phosphate ion from industrial and municipal waste water, which normally contains up to about 100 p.p.m. of dissolved phosphate, the invention is not to be construed as so limited. Provided sufficient alum plus cationic latex is added, virtually any amount of dissolved phosphate may be precipitated from an aqueous solution thereof. However, at higher concentrations of phosphate (above about 10,000 p.p.m.) it may be more practical generally to remove the water by evaporation and recover the phosphate.

The term waste water as used herein is synonymous with the term sewage as the latter term is used by those skilled in the art. Sewage ordinarily is a dilute aqueous mixture of the wastes from households and industry that it is convenient and economical to carry away by water. As used in this specification and in the appended claims, the term sewage refers to any of the ordinary types of aqueous liquors containing significant amounts of wastes, such as fecal matter, domestic wastes, industrial wastes and such like, and is not to be construed as being limited to meaning only aqueous liquors which in lay terms are ordinarily called sewages, nor should it be construed as being limited to means aqueous liquors which have actually been carried through pipe, conduit or sewers.

Treated sewage is intended to include the effluent from primary or secondary settling basins, trickling filters, high-rate aeration or activated sludge processes, contact aeration, sand filtration and other like sewage treatment processes.

The treatment in accordance with our invention is effectuated by the substantially simultaneous or immediately consecutive addition of the alum and the organic cationic latex to the agitated aqueous solution containing the phosphate anion. Where the alum and latex are not added simultaneously either may be added first. The agitation serves to distribute the alum and the cationic latex homogeneously throughout the water being treated. As soon as the alum and the latex are susbtantially homogeneously distributed (normally from about 5 to about 30 minutes agitation is sufficient to achieve this) agitation is terminated. Shortly thereafter a precipitate forms comprising the latex constituents, alum and the majority of the phosphate ion originally dissolved in the water.

Standing for from about 5 min. to about 1 hr. is normally sufficient to precipitate most of the phosphorous present. The water, now virtually free from dissolved phosphate, i.e., less than 15 p.p.m. of phosphate remaining, may be separated from this precipitate by known methods, as for example, by filtration or decantation.

The term "synthetic cationic organic latex," as used herein, contemplates a water based emulsion formed by the free radical induced emulsion polymerization of $C_2$ to $C_{30}$ olefins, $C_4$ to $C_{30}$ dienes and halogen, ester or aryl substituted olefins or dienes of the above chain length or mixtures thereof with each other (or with aliphatic dithiols) in the presence of water and a cationic organic emulsifying agent. The only limitation on the choice of monomer or comonomers from the above denominated group is that the resultant polymer or copolymer must be water insoluble.

Suitable olefins and substituted olefins include, for example, ethylene, propylene, butene, pentene, heptene, octene, decene, dodecene, heptadecene, eicosene, docosene, tricosene, styrene, vinyl chloride, methallyl alcohol, ethyl and methyl acrylate and methacrylate, vinyl acetate, acrylamide, vinylidiene chloride and isopropenyl toluene. Suitable dienes include butadiene, isoprene, dimethyl butadiene, cyclopentadiene, chloroprene and biallyl. The preparation and characteristics of a variety of such latex emulsions are described in "Synthetic Rubber," G. S. Whitley Ed., J. Wiley & Sons, Inc., N.Y., 1954, at 224 et seq. and in Sorenson & Cambell, "Preparative Methods of Polymer Chemistry," Interscience, N.Y., 1961.

Particularly preferred results are obtained when conjugated dienes or halogen-substituted conjugated dienes such as butadiene, chloroprene, cyclopentadiene, dimethyl butadiene and monoethyl butadiene (isoprene) are used to prepare the latex.

Additionally, the olefin, diene or mixture thereof may be copolymerized with up to 50% by weight of nitrogen-containing olefinic comonomer in the presence of a suitable emulsifying agent and water. Preferably 5 to 10 weight percent of the nitrogen-containing comonomer is used.

Illustrative examples of suitable nitrogen-containing comonomers include acrylonitrile, methacrylonitrile, vinylidene cyanide, N-vinylpyrrolidone, dimethylaminoethyl acrylate, olefinic amines of the formula $CH_2=CH-(CH_2)_n-NH_2$ wherein $n$ ranges from 1 to 20, dimethylaminopropyl methyacrylamide, vinyl oxazolines and oxazines and $C_2$ to $C_{20}$ N-alkyl acryamides, maleamides, maleimides and the like.

Any of a wide variety of known cationic organic emulsifying agents which are compatible may be used, the more strongly cationic emulsifiers being preferred. The specific kind and quantity of emulsifying agent used will depend upon the nature of the monomer or monomers present and upon other characteristics of the reaction medium and conditions of polymerization. From about 2 g. to about 10 g. of cationic emulsifying agent is generally used per 100 g. of monomer.

Illustrative examples of suitable cationic emulsifying agents are the quaternary salts derived from suitable inorganic or organic acids or inorganic acid salts and nitrogen-containing compounds such as: $C_{10}$ to $C_{30}$ primary fatty amines, di- to decaethoxylated $C_{10}$ to $C_{30}$ primary fatty amines, secondary and tertiary alkyl amines having to total of from 10 to 30 carbon atoms and ethoxy derivatives of such secondary amines having from 1 to 15 ethoxy groups, $C_{10}$ to $C_{30}$ fatty acid amides of 2-aminomethyl imidazoline, 2-$C_{10}$ to $C_{30}$ alkyl imidazolines and 1-hydroxyethyl imidazolines, trimethylated or triethylated $C_{10}$ to $C_{30}$ n-alkyl amines, 1-amino or 1-hydroxyethyl-2-glyoxaline or $C_{10}$ to $C_{30}$ fatty acid amides or esters thereof, and $C_{10}$ to $C_{30}$ N-alkyl pyridines.

Suitable acids for interaction with the basic nitrogen compound include hydrochloric, hydrobromic, hydroiodic, sulfuric, sulfurous, benzene and toluene sulfonic, phosphoric, nitric, acetic, oxalic, propionic, tartaric, citric, sulfamic, glycolic, diglycolic and ethylenediaminetetracetic. Suitable acid salts include ammonium sulfate, sodium bisulfate, potassium bisulfate, methyl hydrogen sulfate and sodium acid phosphate.

Particularly preferred cationic emulsifying agents include the hydrochloride or acetate quaternary salts of $C_{10}$ to $C_{20}$ alkyl imidazolines, the hydrochloride or acetate quaternary salts of 1 to 15 times ethoxylated $C_{15}$ to $C_{25}$ primary amines, $C_{10}$ to $C_{20}$ N-alkyl trimethyl ammonium chlorides and the hydrochloride or acetate quaternary salts $C_{10}$ to $C_{20}$ primary amines.

From about 1 g. to about 5 g. of water is preferably present per gram of olefin or diene being polymerized.

The polymerization may be effected at any temperature from about $-10°$ C. to $+80°$ C., depending upon the activation temperature of the particular catalyst selected.

Suitable free radical catalysts include, for example, peroxy compounds such as ammonium and alkali metal persulfates (peroxy disulfates), barium peroxide, hydrogen peroxide and organic peroxides such as tertiary butyl hydroperoxide, cumene hydroperoxide, acetyl peroxide, t-butyl-isopropylbenzene hydroperoxide, and benzoyl peroxide, peracids such as peracetic acid and perbenzoic acid, uranyl acetate in the presence of light and the like. In addition, other non-peroxide free radical catalysts such as azobis-isobutyronitrile may be suitably employed. Normally, from about 0.05. g. to about 1.0 g. of catalyst is used per 100 g. of monomer.

Catalyst reactivity may be enhanced by the concomitant use of so-called modifiers or redox system additives such as hydroquinone, lactose, glucose, dihydroxyacetone, sodium hydrogen phosphate, sodium bisulfite, thiosulfate and metabisulfite, copper sulfate, ferrous ammonium sulfate, sodium pyrophosphate/ferric sulfate/cobalt chloride mixture and the like. Use of inorganic redox system additives is particularly desirable when the catalyst is substantially water insoluble. Under these circumstances the polymerization is carried out at a temperature below the activation temperature, in the absence of the redox additive, of the water insoluble catalyst which is in the organic monomer phase, thereby avoiding nonemulsion bulk polymerization of the organic monomer. Chain terminators such as dodecyl mercaptan may also be used to control the configuration and size of the polymer.

The invention can be more fully understood by reference to the following examples. All parts are parts by weight unless otherwise expressly noted.

EXAMPLE 1

The following table presenting data from 17 runs indicates that the treatment of waste water by the simultaneous addition of 10 p.p.m. of a variety of cationic organic latices and 40 p.p.m. of alum is almost as effective at removing dissolved phosphate as treatment with 150 p.p.m. of alum alone (Run 2). Treatment of waste water with cationic latex alone effects essentially no phosphate removal. Treatment with 40 or 50 p.p.m.. of alum alone (Runs 3 and 4) is significantly less effective than treatment with the synergistic combination of 40 p.p.m alum and 10 p.p.m latex. The latex of Runs 5–10, 12, 15 and 16 is formed by homopolymerization of butadiene or isoprene while in Runs 11, 13 and 14 a copolymer of butadiene or isoprene and a nitrogen-containing olefinic comonomer is used. Run 17 shows results obtained with a latex formed from vinyl chloride/ethylene copolymer (Example 15).

PHOSPHATE REMOVAL FROM SEWAGE EFFLUENT

| Run | Treating Agent | Polymer | Emulsifying Agent (as the hydrochloride salt) | Remaining p.p.m. Phosphate |
|---|---|---|---|---|
| 1 | None | None | | 50.0 |
| 2 | 150 p.p.m. alum | do | | 0 |
| 3 | 50 p.p.m. alum | do | | 22.0 |
| 4 | 40 p.p.m. alum | do | | 28.0 |
| 5 | 40/10 p.p.m. alum/cationic latex | Butadiene | Ethomeen T/25 | 1.4 |
| 6 | do | do | Ethomeen 18/12 | 1.5 |
| 7 | do | do | Dodecylamine | 2.8 |
| 8 | do | do | Ethomeen T/12 | 1.5 |
| 9 | do | do | Ethomeen T/15 | 1.3 |
| 10 | do | do | Octadecyl amine | 2.5 |
| 11 | do | Butadiene, DAA | Ethomeen 18/12 | 2.9 |
| 12 | do | Isoprene | do | 7.1 |
| 13 | do | Isoprene N-vinylpyrrolidone | do | 2.5 |
| 14 | do | Butadiene N-vinylpyrrolidone | do | 2.9 |
| 15 | do | Butadiene | Dodecyl imidazoline | 1.8 |
| 16 | do | do | Sipanol 1S2 (acetate salt) | 2.5 |
| 17 | do | Vinyl chloride/ethylene | do | 2.3 |

DAA = Dimethylaminoethyl acrylate.
Ethomeen T/25 = Tallow amine ethoxylated with 15 moles ethylene oxide/mole amine.
Ethomeen 18/12 and Sipanol 1S2 = Stearylamine ethoxylated with 2 moles ethylene oxide/mole amine.
Ethomeen T/12 = Tallow amine ethoxylated with 2 moles ethylene oxide/mole amine.
Ethomeen T/15 = Tallow amine ethoxylated with 5 moles ethylene oxide/mole amine.

EXAMPLE 2

This example illustrates the preparation of a butadiene copolymeric cationic latex.

A mixture of 180 g. distilled water, 0.3 g. potassium persulfate ($K_2S_2O_8$) catalyst and 4.5 g. of dodecylamine hydrochloride emulsifier was mixed in a stainless steel reactor and frozen. Then 9.5 g. of N-vinylpyrrolidone and 75 g. of 1,3-butadiene was added. The reactor was sealed and heated to 50° C., and maintained at this temperature with agitation for 16 hours. On cooling to room temperature and venting, 244 g. of a free-flowing emulsion was obtained.

10 p.p.m. of this latex when used in conjunction with 40 p.p.m. of alum reduces the phosphate content of water from 50 p.p.m. to less than 5 p.p.m.

EXAMPLE 3

Preparation of poly(hexamethylene thioether)

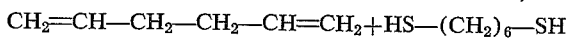

A mixture of 12.30 g. (0.0819 m.) hexamethylenedithiol and 6.72 g. (0.0819 m.) biallyl, both freshly distilled, is prepared and stored in a nitrogen-filled, 10 oz. screw cap bottle. 50 ml. distilled water and 1 g. of dodecyl imidazoline hydrochloride is added to the mixture of monomers, using a nitrogen line at the mouth of the bottle to keep air out. The bottle is capped and cooled to about 5° C. in an ice bath.

A catalyst solution is prepared no more than 5 hr. before the polymerization from the following, using 2.5 ml. of each solution: 1.46 g. ammonium persulfate in 20 ml. distilled water; 0.37 g. sodium metabisulfite in 10 ml. distilled water; 0.37 g. copper sulfate (hydrate) in 100 ml. distilled water. The catalyst mixture is added, again using a nitrogen line for exclusion of air, and the bottle is capped tightly and tumbled in a constant temperature bath maintained at 30° C. This may be accomplished by wiring the bottle very firmly to the end of a metal stirrer shaft which is then placed in the bath at an acute angle so that the bottle is turned mainly end-over-end. After 24 hrs. res resultant emulsion is removed.

10 p.p.m. of this latex when used in conjunction with 40 p.p.m. of alum reduces the phosphate content of water from 50 p.p.m. to less than 5 p.p.m.

EXAMPLE 4

Emulsion polymerization of styrene with persulfate

In a soda pop or beer bottle is placed 100 g. of water, 0.05 g. of potassium persulfate, and 1.0 g. of monoethoxy dibutylamine acetate. When the mixture has dissolved, 50 g. of styrene is added. Nitrogen is bubbled through the mixture to replace the air and disperse the styrene. The nitrogen tube is removed and the bottle is capped and sealed. The bottle is wrapped with some wire screen (to prevent serious damage in the event the polymerization gets out of control) and maintained with intermittent agitation p.p.m. of alum reduces the phosphate content of water cooling to room temperature, the seal is broken and the bottle emptied affording a mobile emulsion.

10 p.p.m. of this latex when used in conjunction with 40 p.p.m. of alum reduces the phosphate content of water from 50 p.p.m. to less than 5 p.p.m.

EXAMPLE 5

Emulsion polymerization of vinyl chloride with persulfate

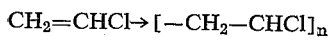

To a well-jacketed, glass lined autoclave (13.5 m.³ capacity) equipped with an agitator, 6000 l. of pure water, 100 l. of tetraethoxy stearylamine hydrobromide and 100 l. of a 1% aqueous potassium persulfate solution is charged. The reaction vessel is sealed and evacuated, then 1800 l. of vinyl chloride is pumped in. Water is circulated in the jacket of the polymerization vessel and polymerization is allowed to proceed. Samples are withdrawn at regular intervals and the density of the polymer dispersion is measured. When the density reaches 1.024, an additional 380 l. of vinyl chloride is pumped in. The polymerization reaction is exothermic and great quantities of heat have to be dissipated through the walls of the polymerization vessel to the cooling medium in the jacket. In order to obtain better heat transfer once the polymerization begins, refrigerated brine is circulated in the cooling jacket at about −20° C. Very accurate control of the temperature of the reaction is necessary since the molecular weight is extremely sensitive to variation in temperature. High molecular weight material is obtained with internal temperatures of 48–50° C. The emulsion product is free flowing.

10 p.p.m. of this latex when used in conjunction with 40 p.p.m. of alum reduces the phosphate content of water from 50 p.p.m. to less than 5 p.p.m.

EXAMPLE 6

Emulsion polymerization of acrylonitrile/butadiene

A 500 ml. three-necked, round bottom flask is fitted with a nitrogen inlet, a stirrer and a reflux condenser. The flask is thermostatically controlled in a bath at about 25° C. and flushed for 15 min. with nitrogen. Then 120 ml. of freshly boiled distilled water is added, stirring is started and the nitrogen flow is reduced to a very slow rate over the surface. To this flask is now added, in order, 2 g. of pentaethoxyeicosylamine hydrochloride, 20 g. of acrylonitrile freed of inhibitor, 60 g. of butadiene, 0.1 g. of potassium persulfate and 0.033 g. of sodium bisulfate. Evidence that the polymerization has started is the appearance of a milkiness, usually in about 5–20 min. If the milkiness does not appear within about 1 hr., an additional amount of persulfate initiator and bisulfate activator may be added. Once begun, polymerization is usually complete in 2–3 hr. However, a small additional yield may be obtained by stirring it overnight. A nearly quantitative yield of polymer is obtained as a stable aqueous emulsion. The particles are nearly spherical with a diameter of approximately $0.1\mu$.

10 p.p.m. of this latex when used in conjunction with 40 p.p.m. of alum reduces the phosphate content of water from 50 p.p.m. to less than 5 p.p.m.

EXAMPLE 7

Emulsion polymerization of vinyl acetate

In a 2 l., round-bottomed flask equipped with a reflux condenser, mechanical stirrer, nitrogen inlet and thermometer is placed 200 g. of vinyl acetate purified by distillation, 400 g. of water, 10 g. of the acetate salt of myristyl imidazoline, 0.5 g. of benzoyl peroxide, and a redox system consisting of 1.4 g. of ferrous ammonium sulfate hexahydrate and 6.0 g. of sodium pyrophosphate decahydrate. The flask is thermostatically controlled at approximately 40° C. and the reaction mixture is blanketed with nitrogen. After approximately 1 hr., polymerization is complete affording a quantitative yield of a stable milky white latex.

10 p.p.m. of this latex when used in conjunction with 40 p.p.m. of alum reduces the phosphate content of water from 50 p.p.m. to less than 5 p.p.m.

EXAMPLE 8

Emulsion polymerization of methyl acrylate

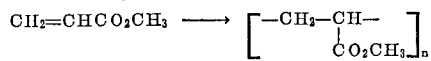

A three-necked flask is fitted with a stirrer, a reflux condenser and a thermometer. The flask is charged with 400 ml. of water, 20 g. of trimethyl dodecylamine hydrochloride and 1 g. of 30% hydrogen peroxide. The solution is stirred slowly and 200 g. of distilled methyl acrylate is added. Heat may be applied to the reaction vessel in order to initiate polymerization. If polymerization does not start within 10 min. after refluxing has occurred, additional hydrogen peroxide may be added. If excessive quantities are required, the monomer is not of sufficient purity. Once initiated, the polymerization usually proceeds at a rate sufficient to cause refluxing without external heating for 15–30 min. After about 30 min. heat is applied, and the refluxing temperature is allowed to rise until it is about 95° C., at which point the polymerization may be considered to be complete. The product is obtained quantitatively as a free-flowing emulsion.

10 p.p.m. of this latex when used in conjunction with 40 p.p.m. of alum reduces the phosphate content of water from 50 p.p.m. to less than 5 p.p.m.

EXAMPLE 9

Emulsion polymerization of vinylidene chloride $$CH_2=CCl_2 \rightarrow [-CH_2-CCl_2-]_n$$

In a 1 l., three-necked flask equipped with a nitrogen inlet, a condenser and a stirrer is placed 100 g. of pure vinylidene chloride, 300 ml. of an aqueous solution containing 3 g. of ammonium persulfate and 3 g. of diethoxylated stearylamine acetate. The air in the reaction vessel is displaced by nitrogen and the temperature is maintained at 30° C. with stirring. After about 6 hrs., polymerization is essentially complete and a polymer emulsion is obtained.

10 p.p.m. of this latex when used in conjunction with 40 p.p.m. of alum reduces the phosphate content of water from 50 p.p.m. to less than 5 p.p.m.

EXAMPLE 10

Preparation of an emulsion of a copolymer of acrylonitrile and isopropenyl toluene

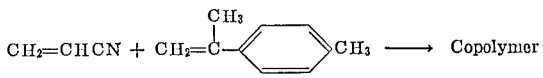

In a 3 l., three-necked flask equipped with a condenser, stirrer and a gas inlet is placed 150 g. of acrylonitrile and 450 g. of isopropenyl toluene. To this mixture of acrylonitrile and isopropenyl toluene is added 1200 ml. of water, 1.2 g. of benzoyl peroxide and 0.4 g. of sodium thiosulfate followed by 40 g. of triethyl myristyl amine hydrobromide.

The polymerization mixture is agitated vigorously and heated on the steam bath for about 14 hours, internal temperature being maintained at about 40–42° C. The mixture is then steam distilled to eliminate any unreacted monomeric materials and in this manner 225–250 g. of polymer is obtained as an emulsion.

10 p.p.m. of this latex when used in conjunction with 40 p.p.m. of alum reduces the phosphate content of water from 50 p.p.m. to less than 5 p.p.m.

EXAMPLE 11

Preparation of a vinyl chloride-vinyl acetate copolymer $$CH_2=CHCl + CH_2=CHOCOCH_3 \rightarrow Copolymer$$

Copolymerization of vinyl acetate with vinyl chloride is carried out in the following manner.

In a glass polymer tube is placed 100 ml. of water, about 5 g. of monoethoxyeicosylamine hydrochloride, 0.3 g. of azobis-isobutyronitrile, 0.1 g. sodium pyrophosphate and 0.02 g. ferric sulfate. This mixture is cooled below the B.P. of vinyl chloride ($-14°$ C.) with a Dry Ice acetone bath. 5 g. of vinyl acetate and 45 g. of vinyl chloride, measured by first condensing into a graduated vessel, are introduced into the pressure tube which is flushed with nitrogen and sealed. The pressure tube is allowed to warm to 40° C. and agitated for a period of 2 hrs. The vessel is now cooled in ordinary ice water and opened affording a quantitative yield of the copolymer as an emulsion.

10 p.p.m. of this latex when used in conjunction with 40 p.p.m. of alum reduces the phosphate content of water from 50 p.p.m. to less than 5 p.p.m.

EXAMPLE 12

Emulsion polymerization of chloroprene

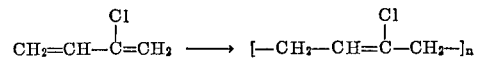

Emulsion polymerization of chloroprene is carried out according to the following procedure. 100 g. of freshly distilled chloroprene is added to 150 ml. of water containing 0.5 g. of cumene hydroperoxide, 0.1 g. sodium hydrogen phosphate and 10 g. eicosylamine acetate.

The mixture is heated to 80° C. and the progress of the polymerization is followed by means of specific gravity changes. The density of the emulsion increases with time and polymerization may be considered complete when the specific gravity of the emulsion is between 1.068 and 1.070. Any excess monomer is decanted.

10 p.p.m. of this latex when used in conjunction with 40 p.p.m. of alum reduces the phosphate content of water from 50 p.p.m. to less than 5 p.p.m.

EXAMPLE 13

Emulsion polymerization of butadiene

A mixture of 4.2 g. of Arquad 12/50 (dodecyltrimethyl ammonium chloride), 150 ml. of water and 0.2 g. of potassium peroxydisulfate (persulfate, $K_2S_2O_8$) was placed in a pressure bottle and frozen. Then 85 g. of butadiene, 0.07 g. of potassium metabisulfite (pyrosulfite, $K_2S_2O_5$) and 0.10 ml. of dodecyl mercaptan were added. 5 g. of butadiene was allowed to boil off to purge the bottle of air. The bottle was then sealed and agitated in a water bath, maintained at 30° C. for 16 hours, after which time the bottle was vented and the product removed as a milky-white free-flowing emulsion.

10 p.p.m. of this latex when used in conjunction with 40 p.p.m. of alum reduces the phosphate content of water from 50 p.p.m. to less than 5 p.p.m.

EXAMPLE 14

The procedure of Example 13 was repeated with the exception that the emulsifying agent used was Monozoline L (1-hydroxyethyl-2-laurylimidazoline). The product had the same appearance as that of Example 13 and was equally effective as a phosphate precipitating agent.

EXAMPLE 15

Ethylene/vinyl chloride emulsion copolymer 8.2 g. of Sipanol 1S2 (stearylamine ethoxylated with 2 mols of ethylene oxide) was transformed into its acetate salt with glacial acetic acid and dissolved in 50 cc. of distilled water. The aqueous solution was placed in a 1 l. steel autoclave and pressurized to 1400 p.s.i.g. with ethylene. Then 147 cc. of vinyl chloride, 5 cc. of a solution of 3.85 g. of ammonium persulfate dissolved in 490 cc. of water and 70 cc. of a solution of 4.9 g. of sodium metabisulfite dissolved in 490 cc. of water were added. Additional vinyl chloride was added until the gas pressure reached 8000 p.s.i.g. The autoclave was rocked for 5 hours with the temperature being maintained at 30° C. with sufficient vinyl chloride being added to maintain the pressure at 8000 p.s.i.g. throughout the course of the reaction. A total of 235 g. of the desired product emulsion were isolated.

Various modifications will be apparent to one skilled in the art, and it is not intended that this invention be limited to the details in the specific examples presented by way of illustration. Accordingly, the scope of the invention is limited only by the appended claims.

We claim:

1. A process for treating phosphate-containing water to obtain a sludge and a substantially phosphate-free effluent which comprises:
   (a) substantially simultaneously or immediately consecutively adding to an agitated influent of said water alum and an organic cationic latex,
   (b) continuing said agitation whereby said alum and said organic cationic latex are substantially homogeneously distributed throughout said phosphate-containing water,
   (c) terminating said agitation and allowing the said treated water to remain in a substantially quiescent state whereby a precipitate comprising alum, phosphate and organic cationic latex constituents forms,
   (d) separating said precipitate from said treated water.

2. A process in accordance with claim 1 wherein said separation is effected by decantation.

3. A process in accordance with claim 1 wherein said phosphate-containing water is raw sewage or treated sewage.

4. A process in accordance with claim 1 wherein said alum is added in an amount of from about 40 to about 120 p.p.m. per 100 p.p.m. of phosphate present in said influent water.

5. A process in accordance with claim 1 wherein said organic cationic latex is added in an amount of from about 10 to about 40 p.p.m. per 100 p.p.m. of phosphate present in said influent water.

6. A process in accordance with claim 1 wherein said organic cationic latex is substantially homogeneous latex emulsion comprising water, polybutadiene and a cationic emulsifying agent.

References Cited

UNITED STATES PATENTS

| | | | |
|---|---|---|---|
| 3,142,638 | 7/1964 | Blaisdell et al. | 210—53 X |
| 3,386,910 | 6/1968 | Forrest | 210—6 X |

MICHAEL E. ROGERS, *Primary Examiner.*

U.S. Cl. X.R.

210—53, 54; 260—94.2